United States Patent [19]

Matsuura et al.

[11] Patent Number: 5,099,808
[45] Date of Patent: Mar. 31, 1992

[54] DIRECT INJECTION DIESEL ENGINE INDUCTION SYSTEM HAVING VORTICAL FLOW INDUCING INDUCTION VALVE

[75] Inventors: Tooru Matsuura; Masato Taniguchi, both of Nagoya, Japan

[73] Assignee: NGK Spark Plug Co., Ltd., Nagoya, Japan

[21] Appl. No.: 479,410

[22] Filed: Feb. 13, 1990

[30] Foreign Application Priority Data

Mar. 3, 1989 [JP] Japan .................... 1-25053

[51] Int. Cl.$^5$ .................... F01L 3/02; F01L 3/06
[52] U.S. Cl. .................... 123/188.7; 123/188.3; 123/188.14
[58] Field of Search ........ 123/668, 188 AA, 188 VA, 123/188 M, 52 M

[56] References Cited

U.S. PATENT DOCUMENTS

| | | | |
|---|---|---|---|
| 4,016,846 | 4/1977 | Nakamo | 123/52 M |
| 4,031,699 | 6/1977 | Suga et al. | 123/668 |
| 4,137,886 | 2/1979 | Hiramatsu | 123/188 M |
| 4,300,494 | 11/1981 | Graiff et al. | 123/668 |
| 4,359,022 | 11/1982 | Nakamura et al. | 123/188 AA |
| 4,398,527 | 8/1983 | Rynbrandt | 123/668 |
| 4,424,777 | 1/1984 | Klomp | 123/188 VA |
| 4,781,157 | 11/1988 | Wade et al. | 123/193 H |
| 4,852,542 | 8/1989 | Kamo et al. | 123/668 |
| 4,980,321 | 12/1990 | Tsujimura | 501/95 |

*Primary Examiner*—E. Rollins Cross
*Assistant Examiner*—Erick Solis
*Attorney, Agent, or Firm*—Foley & Lardner

[57] ABSTRACT

An induction valve of a direct fuel injection diesel engine has helical flow director flanges formed on the upstream side for directing the inducted air into a vortical flow within the combustion chamber. The flow directing flanges are formed on the valve and the induction port with which the valve is associated has an extremely simple configuration. An induction passage liner is simply configured to reduce the resistance to air flow.

22 Claims, 5 Drawing Sheets

DIRECT INJECTION DIESEL ENGINE INDUCTION SYSTEM HAVING VORTICAL FLOW INDUCING INDUCTION VALVE

BACKGROUND OF THE INVENTION

1. Field of the Invention

The instant invention relates to an air induction arrangement for improving the combustion characteristics of direct fuel injected diesel engines. More specifically, the instant invention relates to a system whereby the inducted air is guided so as to form a vortical flow within the engine cylinder which mixes with the injected fuel more efficiently.

2. Description of the Prior Art

Among the advantages of direct fuel injected diesel engines are their relatively high thermal and fuel efficiencies. Among their disadvantages is their tendency to produce large quantities of noxious black smoke containing rather large quantities of NOx and HC. This tendency is attributed to the inherent difficulty of mixing the air and fuel during the brief period of the compression stroke.

FIGS. 1 to 3 show two induction port arrangements which are formed in the prior art cylinder heads C and D, respectively. In these arrangements attempts were made to improve combustion by forming the air induction ports in such a manner as to introduce the air into the combustion chamber in the form of a vortical flow to improve the dispersion of the injected fuel with the inducted air.

In the prior art embodiment shown in FIG. 1, the air induction port 100 defines a tapering helix or spiral-shaped arrangement which is defined about the general axis of the valve stem 320. This causes the intake air flow 400 which flows into the combustion chamber past the valve skirt 310, to circulate within the combustion chamber in the form of a vortical flow 410.

In the second prior art arrangement, shown in FIGS. 2 and 3, the air induction port 100 has a helical configuration which terminates at the valve seat of the induction valve 300 so that, as in the FIG. 1 arrangement, the intake air 400 is caused to circulate in the form of a vortical flow 410 upon entering the combustion chamber.

In the above prior art induction passages certain problems are inherent. For example, in the arrangement shown in FIG. 1 the induction port becomes inordinately long. Therefore, when the intake air is heated upstream of the induction valve in order to make the engine easier to start when it's cold, by the time it reaches the combustion chamber a significant amount of heat has been lost to the walls of the air induction port 100 with the result that the pre-heating is partially negated.

In order to reduce the effect of the cylinder walls on temperature of the intake air 400, it is conceivable to form the walls of the air induction port 100 of a ceramic material in an attempt to insulate the intake air 400 from the cylinder head C. Unfortunately, this raises difficulties in that, due to its convolute nature, the forming a ceramic induction port liner which can fit inside of the air induction port 100 of the cylinder head, is difficult and once formed it is nearly impossible to successfully embed in the cylinder head C during the molding process.

During the molding process of the cylinder head D there is also a strong tendency for stresses to become concentrated at the convex portions such as indicated by circle 110 in FIG. 4, resulting in the formation of cracks in the ceramic helical induction port liner.

Another problem with the air induction port 100 comes in that the helical configuration creates a flow resistance which renders it difficult to supply large amounts of air into the combustion chamber and thus lowers the charging efficiency of the system.

SUMMARY OF THE INVENTION

In view of the above problems it is an object of the invention to provide an induction arrangement which creates an essentially vortical flow within the combustion chamber, which reduces induction air flow resistance, and which can be formed inexpensively.

It is another object to provide an induction arrangement wherein the configuration of an induction port liner is simplified and facilitates the use of ceramics in forming the same.

It is still another object of the instant invention to reduce the amount of heat transferred between the cylinder head and the inducted air In brief, above objects are achieved by an air induction port arrangement wherein an air flow directing vanes are formed on the induction valve and the induction air port is formed so as to have a simply curved configuration and center line which lies substantially in a plane common to the valve stem axis.

In one embodiment the air induction port is lined with a curved tube-shaped ceramic liner which exhibits heat insulation properties.

In another embodiment the air induction port is lined with a thin walled curved tube formed of a metal alloy having low heat transmission properties. Air spaces are formed around the liner so as to reduce the amount of the liner in direct contact with the cylinder head and to form an insulating air layer which reduces heat transmission between the cylinder head and the air being inducted.

More specifically, a first aspect of the present invention is deemed to comprise a cylinder head for a direct injection diesel engine which features: an air induction opening formed in the cylinder head, the air induction opening communicating with a combustion chamber of the engine; an induction valve, the induction valve being formed of a ceramic material and reciprocal along its axis to open and close the air induction opening, the induction valve comprising a valve stem, a valve skirt and a plurality of flow deflector ribs, the flow deflector ribs deflecting a flow of intake air which enters the combustion chamber through the air induction port in such a manner that it assumes a vortical flow path; and an air induction port, the air induction port being curved, having a center line which substantially lies in a plane which is common to a plane occupied by the axis of the valve stem, the downstream end of the induction port terminating at the air induction port.

A second aspect of the present invention is deemed to comprise a cylinder head for a direct injection diesel engine which features: an air induction opening which opens into a combustion of the engine; an induction valve, the induction valve being operable to open and close the air induction port, and flow deflector means, the flow deflector means being formed on the valve for deflecting a flow of intake air passing through the air induction opening in such a manner as to undergo vortical flow.

A third embodiment of the present invention is deemed to comprise an internal combustion engine cylinder head which features: a thermally insulated induction port, the induction port leading to an air induction opening which opens into an engine cylinder, the induction port being so constructed and arranged so that heat exchange between air which passes through the induction port and the cylinder head is attenuated and so that resistance to flow tends to be minimized; an induction valve, the induction valve being operable to open and close the air induction opening, the induction valve being formed of a material which exhibits low heat transfer characteristics; flow deflector means, the flow deflector means being formed on the valve for inducing a flow of intake air which passes through the air induction opening to undergo vortical flow; and means for directly injecting fuel into the cylinder.

DETAILED DESCRIPTION OF THE PREFERRED EMBODIMENTS

Figure 1:
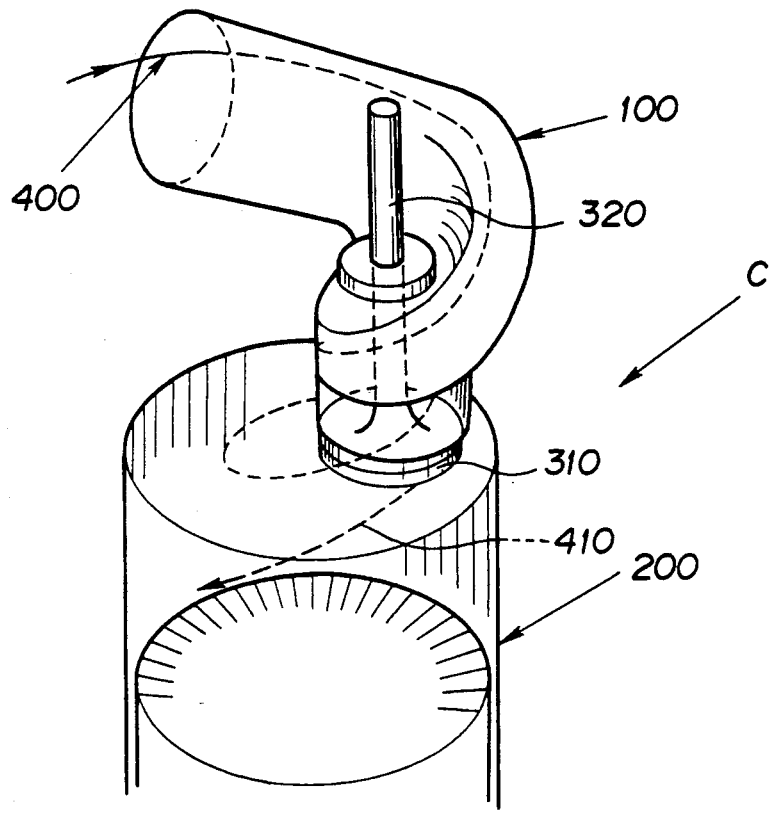
FIG. 1 is a schematic depiction of a first prior art spiral or helical type induction port arrangement wherein the cylinder head is rendered invisible so as to clearly show the induction port configuration.
Figure 2:
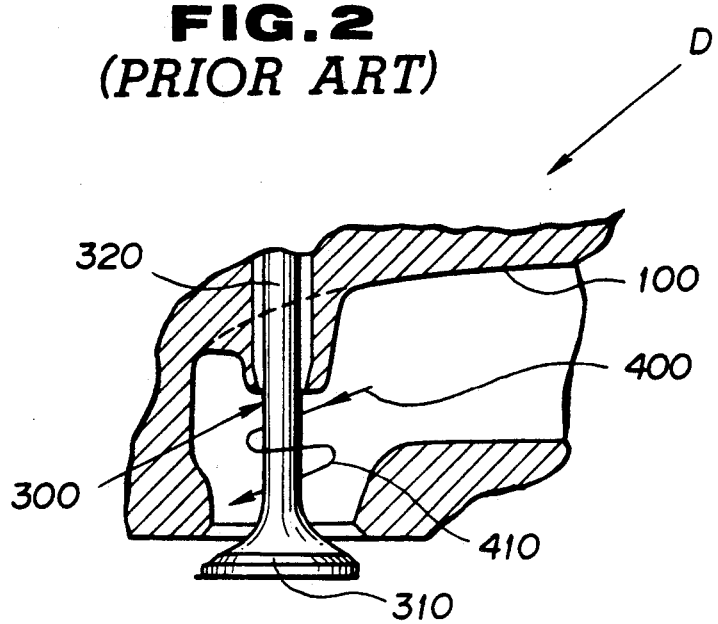
FIG. 2 is a cross-section view of a second prior art helical induction port which was discussed along with the first one in the opening paragraphs of the instant disclosure.
Figure 3:
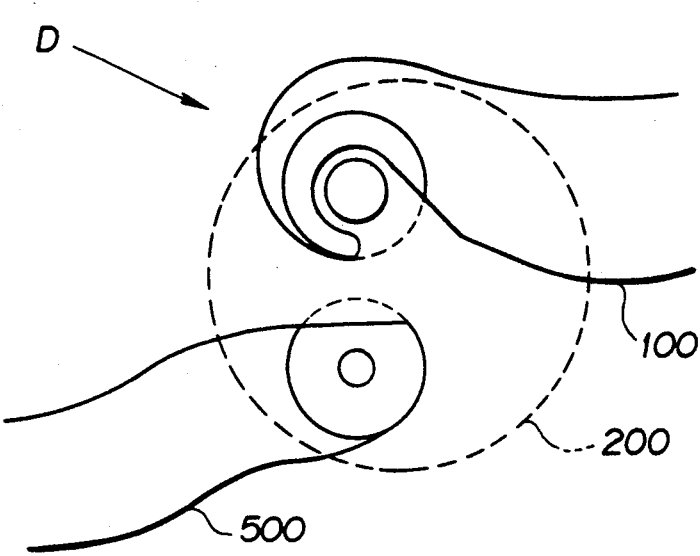
FIG. 3 is a schematic cross-section plan view of the induction port of FIG. 2.
Figure 4:
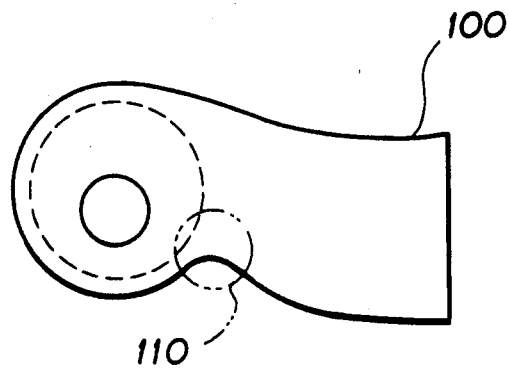
FIG. 4 is a schematic cross-section plan view of an induction port showing the type of location where a ceramic liner is apt to break if provided.
Figure 5:
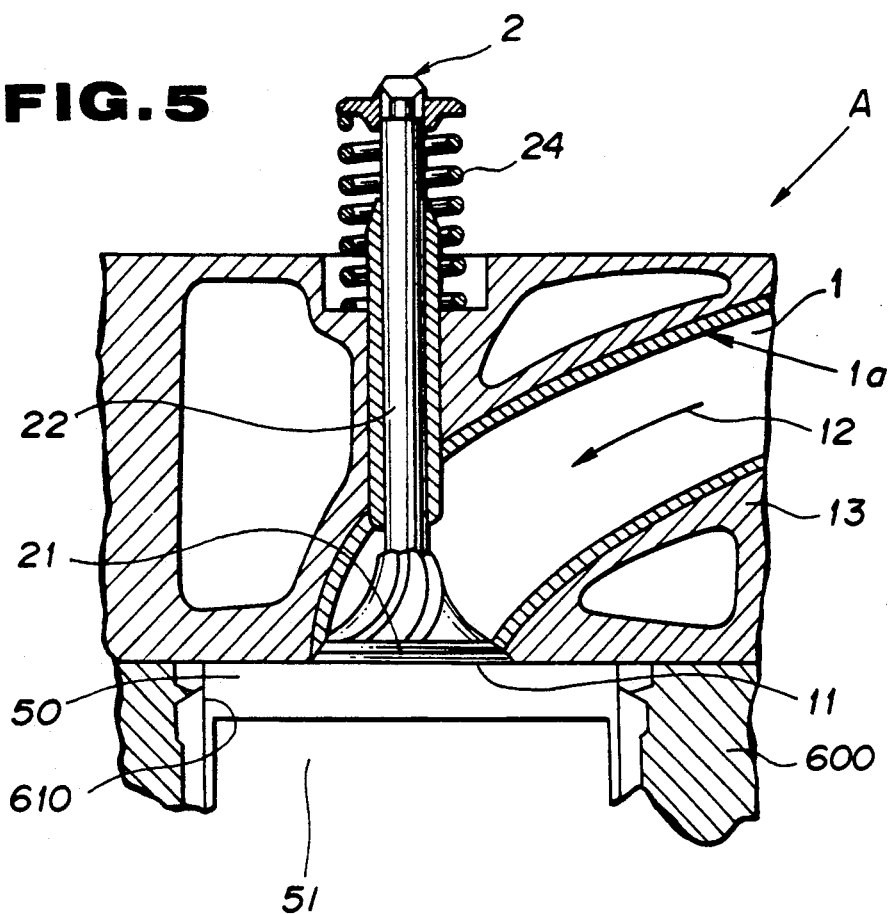
FIG. 5 is a cross-section view of an induction arrangement according to a first embodiment of the present invention.
Figure 6:
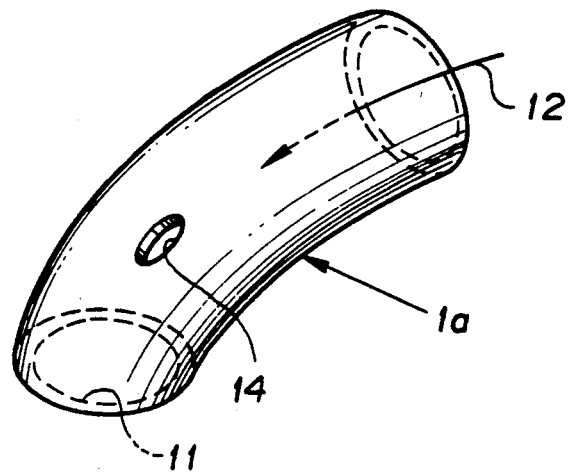
FIG. 6 is a perspective view of ceramic port liner according to the first embodiment.

FIG. 5 shows a direct fuel injection diesel engine cylinder head A according to the first embodiment of the invention. In this arrangement an air induction port 1 leads to intake opening 11 through which inducted air 12 is drawn into a combustion chamber 50. The combustion chamber is conventionally defined within an engine cylinder 610 by a reciprocal piston 51.

An induction valve 2 comprising a valve stem 22 and valve skirt 21, is provided at the downstream end of the air induction port 1 and is reciprocal along its axis so as to selectively open and close the air induction port 1 and control the admission of air into the combustion chamber 50.

Figure 9:
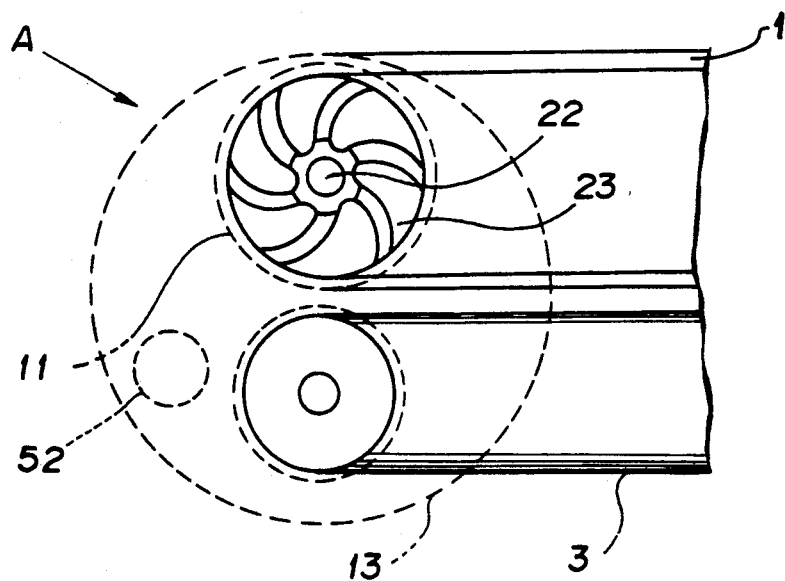
FIG. 9 is a schematic plan view of a portion of a cylinder head which is provided with the induction port arrangement according to the first embodiment of the invention.

The cylinder head A is bolted to an engine block 600 wherein the piston 51 is reciprocally disposed. As seen in FIG. 9 an exhaust port 3 through which exhaust gasses are expelled is formed adjacent the air induction port 1. Fuel injection means 52 is arranged to inject fuel directly into the combustion chamber 50. As will be appreciated, there are a number of different techniques via which fuel can be directly injected. As the manner in which injection is made is not directly related to the instant invention, the instant indication is general and not intended to specifically indicate any one specific type of technique.

An air induction port liner 1a is formed of a ceramic having a large content of titanium aluminum (AL2 TiO5) and is embedded in the cylinder head assembly 13 during the molding process.

Figure 8:
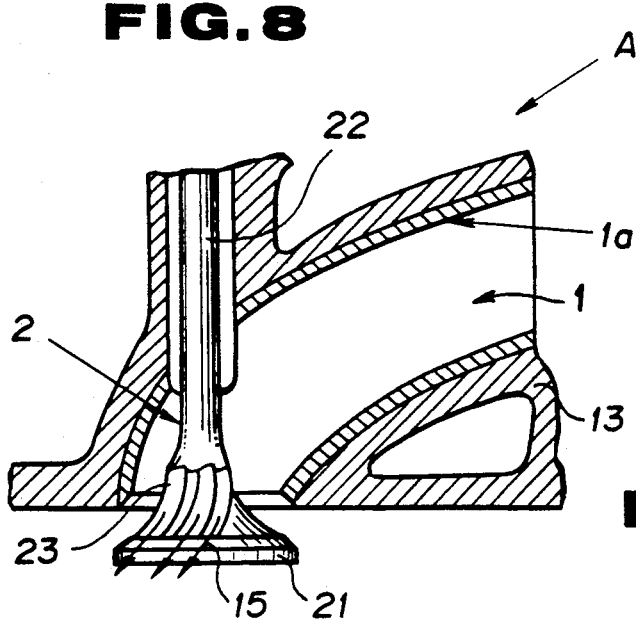
FIG. 8 is a cross-section view of an induction port and valve according to a first embodiment of the instant invention showing the manner in which the vortical flow is created.

The center line of the induction port 1 lies substantially within a plane which contains the axis of the valve stem 22. The air induction port 1 as seen in FIGS. 5 and 8 has a simply curved configuration and has a smooth surface to promote laminar flow.

A valve stem receiving hole 14 is formed in the air induction port liner 1a so as to facilitate the reciprocal movement of the valve stem therewithin.

The air induction port 1 is formed so as to direct the inducted air 12 into the combustion chamber 50 with very little deflection.

Figure 7:
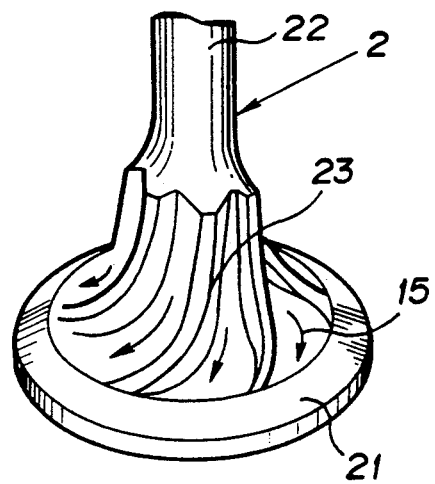
FIG. 7 is a perspective view showing the provision of vortical flow inducing vanes which are formed on the head of an induction valve according to the instant invention.

The induction valve 2 is formed of a ceramic containing a large percentage of silicon and nitrogen. As shown in FIG. 7 the valve skirt 21 is formed with a plurality of helical flanges or flow deflector ribs 23. The helical flow deflector ribs 23 serve to guide the inducted air 12 from the air induction port 1 and form the same into a vortical flow 15. The induction valve 2 is operatively connected with a valve spring 24 and a valve train (not shown) by which it is selectively opened against the bias of the spring 24.

As the interior surface of the air induction port liner 1a is smooth and the curvature thereof is relatively gradual, the resistance to the inducted air 12 tends to be reduced.

Further, due to the extremely simple configuration of the air induction port liner 1a, it can be embedded in the cylinder head assembly 13 during the molding process.

Due to the insulating nature of the ceramic material (AL2 TiO5) from which the air induction port liner 1a is formed, there is a greatly reduced tendency for the heat in the main body 13 of the cylinder head to be transferred to the inducted air 12 and vice versa. Therefore, when the inducted air 12 is pre-heated to assist cold starts, relatively little heat is lost to the walls of the air induction port liner 1a on the way to the combustion chamber 50, and once the main body of the cylinder head 13 has become hot, very little heat is transferred to the inducted air 12.

Therefore, since the inducted air 12 remains relatively cool even when the engine is fully warmed-up, the charging efficiency and cylinder compression remain high.

Since the vortical induction flow 15 is formed by the helical flow deflector ribs 23, which are formed directly on the valve skirt 21, the rotation rate of the flow can be adjusted according to the demands of the particular engine by selection of the number size and curvature of the helical flow deflector ribs 23. It also becomes possible to alter the vortical induction flow 15 of an engine by replacing the induction valve 2 with another having differently arranged ribs.

Tests were conducted which compared the above disclosed embodiment with the prior art type cylinders heads C and D. The cylinder head fitted with the induction port according to the first embodiment was secured to a 6 cylinder 5000 cc diesel engine. The engine exhibited improved cold starting and combustion characteristics. Smoke emissions were comparatively lower than in the case of the prior art.

SECOND EMBODIMENT

Figure 10:
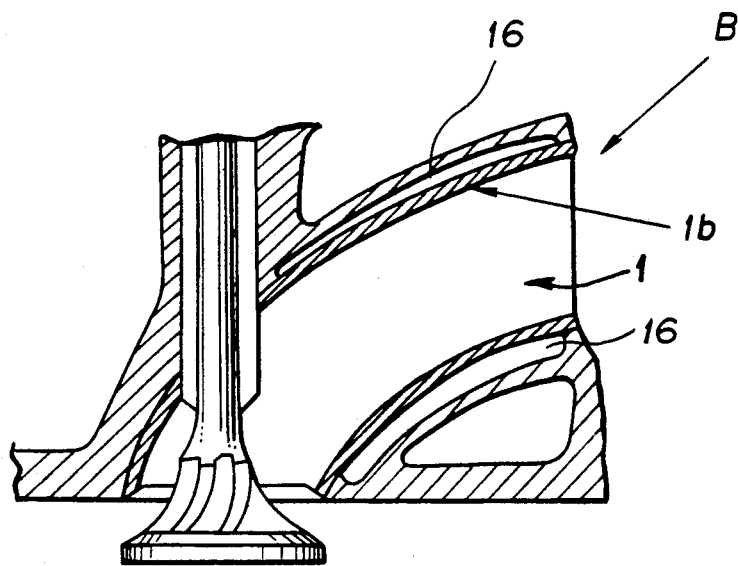
FIG. 10 is a cross-sectioned elevation of an induction port and valve according to a second embodiment of the instant invention.

In the second embodiment of the instant invention depicted in FIG. 10, the direct fuel injection diesel engine cylinder head B comprises an air induction port liner 1b which is formed or relatively thin walled tube of SUS (stainless steele). The SUS material, from which the air induction port liner 1b is formed, has a rather low heat transmission rate.

An insulating air space or void 16 is defined by a recess which formed in the wall of the induction port 1 and which is closed by an induction port liner 1b. This insulating void 16 serves to insulate the air induction port liner 1b from the main body of the cylinder head B, thus attenuating heat exchange between the inducted air 12 and the cylinder head.

In comparison with the direct fuel injection diesel engine cylinder head A of the first embodiment cylinder head B of the second embodiment is slightly heavier since the air induction port liner 1b is formed of metal. On the other hand, since the air induction port liner 1b is formed of metal, the molding process is considerably easier than with the engine cylinder head A of the first embodiment.

THIRD EMBODIMENT

Figure 11:
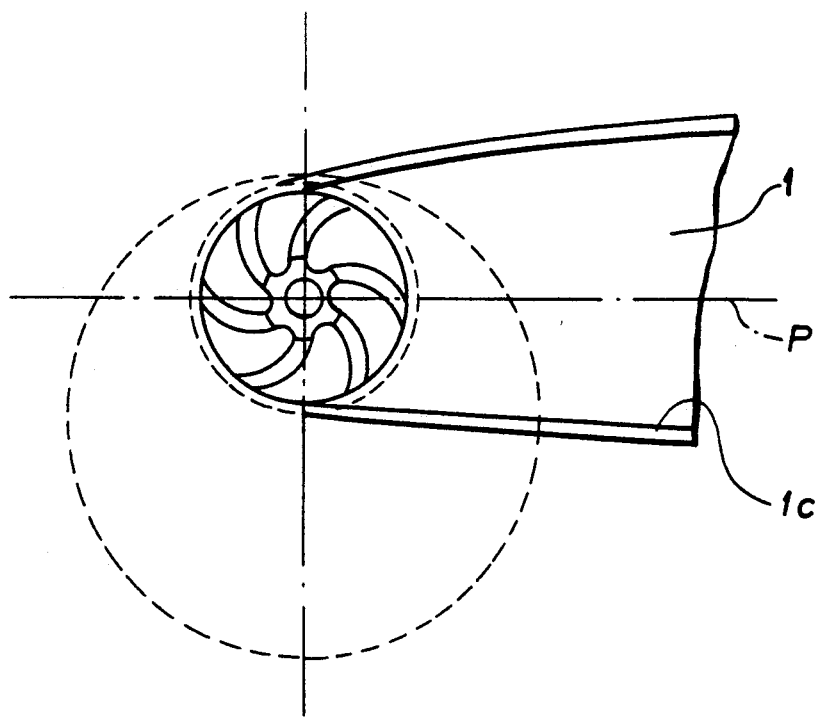
FIG. 11 is a schematic plan view of an induction port according to the third embodiment instant invention wherein the induction port is tapered.

In FIG. 11 an alternative configuration of the induction port is shown. In this arrangement the air induction port liner 1c is essentially identical to that 1a of the first embodiment except that it is slightly tapered.

It will be understood by those skilled in the art, that other embodiments of the instant invention are conceivable. For example it may be desirable to form the induction port with a flared upstream end. Also it will be understood that, although the induction passages and the valve of above embodiments were disclosed as being formed of specific materials, other materials may be used in forming the induction port arrangement of the instant invention without departing from the principles of the same which will be understood to be limited only by the appended claims.

It will also be understood that the reduced heat transfer between the cylinder head and the inducted air resulting from the reduced length of the induction ports, embodiments wherein the induction port liner is actually omitted are also easily conceivable within the scope of the invention.

What is claimed is:

1. A cylinder head for a direct injection diesel engine comprising,
   an air induction opening formed in said cylinder head, said air induction opening communicating with a combustion chamber of the engine;
   an induction valve, said induction valve being formed of a ceramic material and being reciprocal along its axis to open and close said air induction opening, said induction valve comprising a valve stem, a valve skirt and a plurality of integral flow deflector ribs, said flow deflector ribs deflecting a flow of intake air which enters said combustion chamber through said air induction port in such a manner that is assumes a vortical flow path;
   an air induction port, said air induction port having a simply curved configuration which promotes laminar air flow and having a center line which substantially lies in a plane which is common to a plane occupied by the axis of said valve stem, the downstream end of said induction port terminating at said air induction port; and
   a tube-shaped passage liner disposed in said air induction port, said tube-shaped liner having an essentially uniform shaped cross-section along its length.

2. A cylinder head as set forth in claim 1, wherein said air induction port comprises an air induction passage liner, said air induction passage liner being formed of a ceramic material.

3. A cylinder head for a direct injection diesel engine comprising:
   a thermally insulated air induction port which leads to a combustion chamber of the engine;
   an induction valve formed of a thermally insulating material, said induction valve being operable to open and close said air induction port, and
   flow deflector means on said valve for deflecting a flow of intake air passing into the combustion chamber in such a manner as to establish and augment vortical flow.

4. A cylinder head as set forth in claim 3, wherein said induction valve has a valve skirt, and wherein said flow deflector means is defined by a plurality of helical flow deflector ribs formed on an upper surface of said valve skirt of said induction valve.

5. A cylinder head as set forth in claim 4, wherein said said induction valve is formed of a ceramic material.

6. A cylinder head as set forth in claim 3, wherein an air induction passage associated with said induction port has an air induction passage liner disposed on the inner periphery thereof.

7. A cylinder head as set forth in claim 6, wherein said air induction passage liner is composed of ceramic.

8. A cylinder head as set forth in claim 6, wherein said air induction passage liner is composed of stainless steel which exhibits a low heat transmission rate.

9. A cylinder head as set forth in claim 6, wherein an insulating void is formed about the outer periphery of said air induction passage liner.

10. An internal combustion engine cylinder head comprising;
    a thermally insulated induction port, said induction port leading to an air induction opening which opens into an engine cylinder, said induction port being so constructed and arranged that heat exchange between air which passes through said induction port and said cylinder head is attenuated, so that resistance to air flow tends to be minimized, and so that a tendency for the air flowing therethrough to be caused to assume a vortical flow pattern, is absent;
    an induction valve, said induction valve being operable to open and close said air induction opening, said induction valve being formed of a material which exhibits low heat transfer characteristics;
    flow deflector means, said flow deflector means being formed on said valve for initiating and augmenting vortical flow in a flow of intake air which passes through said air induction opening; and means for directly injecting fuel into said cylinder.

11. A cylinder head as set forth in claim 10, wherein said flow deflector means is defined by a plurality of flow deflector ribs formed on an upper surface of a skirt of said induction valve.

12. In a diesel engine:

thermally insulated induction port means for attenuating heat exchange between air which passes through said induction port and said cylinder head and for minimizing resistance to air flow to a combustion chamber;

a ceramic inlet valve which controls communication between the thermally insulated port means and the combustion chamber;

flow deflector means, said flow deflector means being formed integrally on the head of a ceramic inlet valve which controls communication between the thermally insulated port means and the combustion chamber for promoting vortical flow in a flow of intake air which passes into the combustion chamber; and means for directly injecting fuel into said cylinder.

13. In a diesel engine:

means for directly injecting fuel into a combustion chamber;

induction port means for minimizing air flow resistance to the combustion chamber;

induction port liner means for preventing heat from pre-heated air being released to the engine during cold engine starts and for preventing heat from being transferred from the engine to the air in the induction ports when the engine is hot; and swirl generating means for inducing air to undergo vortical flow, said swirl generating means being formed integral with a ceramic inlet valve which controls the communication between the induction port means and the combustion chamber.

14. A cylinder head as claimed in claim 1, wherein said tube shaped liner is formed of $Al_2TiO_5$.

15. A cylinder head as claimed in claim 1, wherein said tube shaped liner is formed of $Al_2TiO_5$ and said cylinder head is formed of an aluminum alloy.

16. A cylinder head as claimed in claim 7, wherein said ceramic material is $Al_2TiO_5$.

17. An internal combustion engine cylinder is claimed in claim 10, wherein said thermally insulated induction port is lined with a ceramic material.

18. A cylinder head as claimed in claim 10, wherein said ceramic material is $Al_2TiO_5$.

19. A diesel engine as claimed in claim 12, wherein said thermally insulated induction port means is lined with a ceramic material.

20. A cylinder head as claimed in claim 19, wherein said ceramic material is $Al_2TiO_5$.

21. A cylinder engine as claimed in claim 13, wherein said liner means is formed from a ceramic material.

22. A cylinder head as claimed in claim 21, wherein said ceramic material is $Al_2TiO_5$.

* * * * *